A. BREAR.
Evaporating Pan.

No. 35,007. Patented Apr. 15, 1862.

Witnesses:
James Lawd
R. Gawley

Inventor:
Abel Brear

UNITED STATES PATENT OFFICE.

ABEL BREAR, OF SAUGATUCK, CONNECTICUT.

IMPROVED APPARATUS FOR DISCHARGING LIQUIDS FROM KETTLES AND OTHER VESSELS.

Specification forming part of Letters Patent No. 35,007, dated April 15, 1862.

*To all whom it may concern:*

Be it known that I, ABEL BREAR, of Saugatuck, in the county of Fairfield and State of Connecticut, have invented a new and useful Improvement in Means of Discharging Liquids from Kettles and other Vessels by the Pressure of Steam or Compressed Air; and I do hereby declare that the following is a full, clear, and exact description of the same, reference being had to the accompanying drawings, forming part of this specification, in which—

Figure 1:
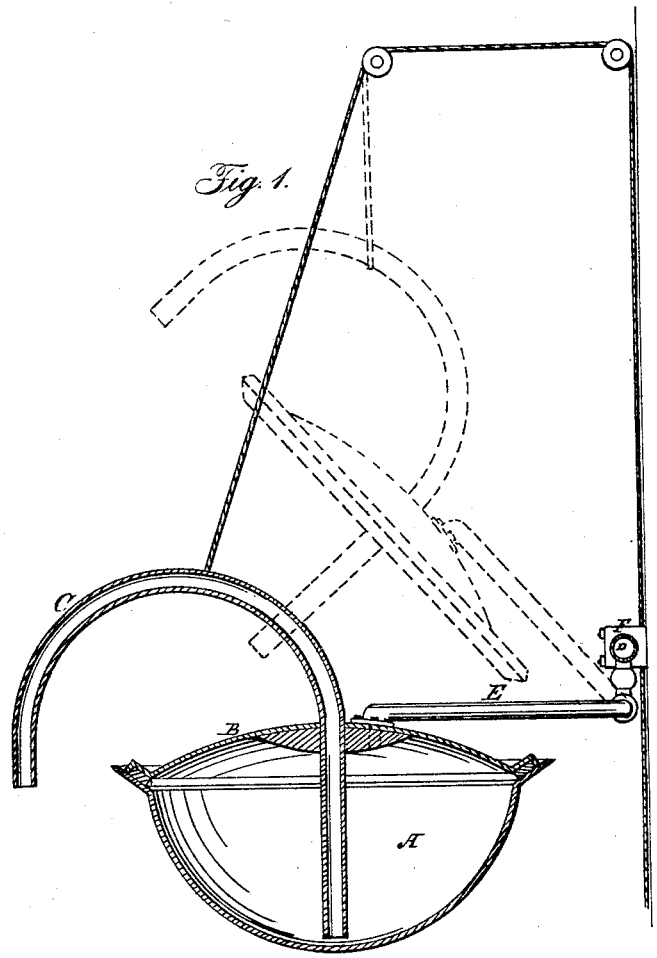
Figure 2:
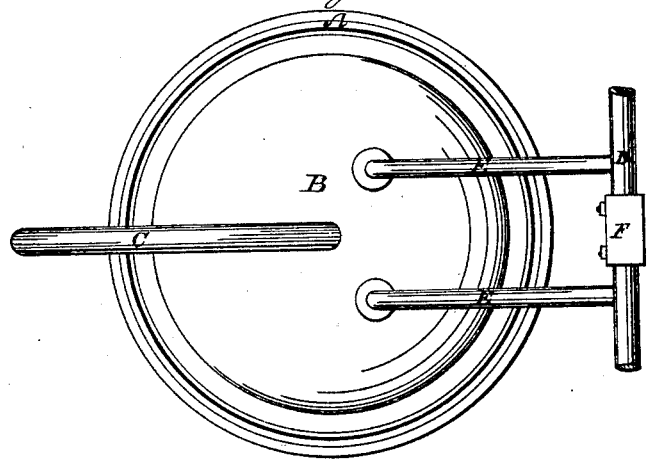

Figure 1 is a vertical section of a kettle with my invention applied. Fig. 2 is a plan of the same.

Similar letters of reference indicate corresponding parts in both figures.

The principal object of this invention is to provide a convenient means of discharging large vessels used in manufacturing purposes of either hot or cold liquids. On the 1st day of April, 1862, I obtained Letters Patent for the use, for discharging vessels, of a movable cover and attached pipe for the discharge of vessels by the pressure of steam generated from the liquids within the vessels, but that invention is only applicable for the discharge of liquids while in a boiling condition. This invention consists in the attachment of such cover and pipe, by means of hollow arms or branch pipes, to a main pipe for the supply of steam or compressed air above the surface of the liquid in a vessel from a boiler, compressing apparatus, or reservoir, the said main pipe being so arranged relatively to the vessel, and the connections of such hollow arms or branch pipes with the main pipe being of such character, or the portion of the main pipe to which the said arms or branch pipes are connected being so arranged and applied, as to permit the opening and closing of the cover without disconnecting it from the main pipe or disturbing its connectings therewith. By this means I am enabled to discharge, the vessel of liquids in a cold or merely warm, as well as in a boiling, condition.

To enable others to make and use my invention, I will proceed to describe its construction and operation.

A is the vessel to be discharged.

B is the movable cover, having its edges so constructed or furnished with packing as to fit perfectly tight around the mouth of the vessel, and made heavy enough or loaded sufficiently to prevent it from being raised by the pressure of steam or air that is necessary to effect the discharge of the liquid from the vessel.

C is the discharge-pipe, inserted through and secured tightly in the cover B. This pipe is long enough to reach to or nearly to the bottom of the vessel when the cover is on, and the portion outside of the cover is formed to deliver the liquid over one side of the vessel.

D is the main pipe for the supply of the steam or compressed air, and E E are two hollow arms or branch pipes which connect the cover B therewith. The main pipe is arranged horizontally in fixed supports F, at such distance from and above the vessel, and the hollow arms or branch pipes are of such length and so formed as to allow the cover to open freely and to close perfectly tight. The opening and closing of the cover may be provided for by making the portion of the main pipe to which the hollow arms or branch pipes are attached movable on its axis on or in stuffing-box joints connecting it with stationary portions of the said pipe, or by connecting the hollow arms or branch pipes with the main pipe by means of turning sockets, making the whole of the main pipe stationary. The main pipe D must be furnished with a stop-cock for letting on and shutting off the steam or air to or from the vessel A, or the connections of the hollow arms or branch pipes with the main pipe may be so constructed as to produce the shutting off of the steam or air by the act of raising the cover, and the letting on of the steam by the act of closing the cover.

Provision may be made for opening the cover by means of a tackle and pulleys suitably applied above it.

In the operation of the vessel, if it is required to be open, the cover is to be raised and held up in the position indicated in red outline in Fig. 1, and when it is desired to discharge the vessel, the cover is let down upon it, and the main pipe D is opened to admit steam or compressed air through the hollow arms or branch pipes E E, under the cover and above the liquid in the vessel, that by its pressure on the surface of the liquid the latter may be forced out through the pipe C.

What I claim as my invention, and desire to secure by Letters Patent, is—

The combination of the movable cover B and discharge-pipe C with a steam or air pipe, D, by means of one or more hollow connecting-arms or branch pipes, E E, in such manner as to effect the discharge of the vessel to which the cover is fitted by means of steam or compressed air admitted to the said vessel from the said pipe D through the said hollow connecting-arms or branch pipes, substantially as herein specified.

ABEL BREAR.

Witnesses:
JAMES LAIRD,
R. GAWLEY.